United States Patent [19]

Boer

[11] 4,013,162
[45] Mar. 22, 1977

[54] INSTALLATION FOR THE THERMAL TREATMENT OF OBJECTS

[75] Inventor: Jort Boer, Oostzaan, Netherlands

[73] Assignee: Stork Amsterdam B.V., Amstelveen, Netherlands

[22] Filed: July 1, 1975

[21] Appl. No.: 592,210

Related U.S. Application Data

[63] Continuation-in-part of Ser. No. 410,399, Oct. 29, 1973, abandoned.

[30] Foreign Application Priority Data

Oct. 27, 1972 Netherlands .................. 7214631

[52] U.S. Cl. .............................. 198/409; 198/436
[51] Int. Cl.² ...................................... B65G 47/24
[58] Field of Search ............ 198/20 R, 22 R, 22 B, 198/26, 27, 31 R, 31 AC, 31 AB, 45, 131, 143, 236, 237, 268–271, 277

[56] References Cited

UNITED STATES PATENTS

| | | | |
|---|---|---|---|
| 2,013,032 | 9/1935 | Chelle | 198/27 |
| 2,037,623 | 4/1936 | Forster | 198/31 AC |
| 3,374,752 | 3/1968 | Shirozu | 198/20 R |
| 3,543,908 | 12/1970 | Holland | 198/31 AC |
| 3,625,336 | 12/1971 | Fuwa et al. | 198/22 B |
| 3,814,234 | 6/1974 | Santen | 198/143 |
| 3,842,963 | 10/1974 | Kemper | 198/31 AC |

Primary Examiner—Evon C. Blunk
Assistant Examiner—Joseph E. Valenza
Attorney, Agent, or Firm—Edmund M. Jaskiewicz

[57] ABSTRACT

An installation for the pasteurization or sterilization of products packed in containers comprises a treatment space with a conveyor travelling through this space and having carriers for supporting the containers. The conveyor passes along a loading and a discharging station. Each carrier has a plurality of equally spaced partitions to define a number of compartments. A supply conveyor at the loading station has driving dogs spaced from each other equal to the distance between the carrier partitions. A discharge device is provided with the same number of tiltable catching elements as there are compartments in each carrier.

5 Claims, 7 Drawing Figures

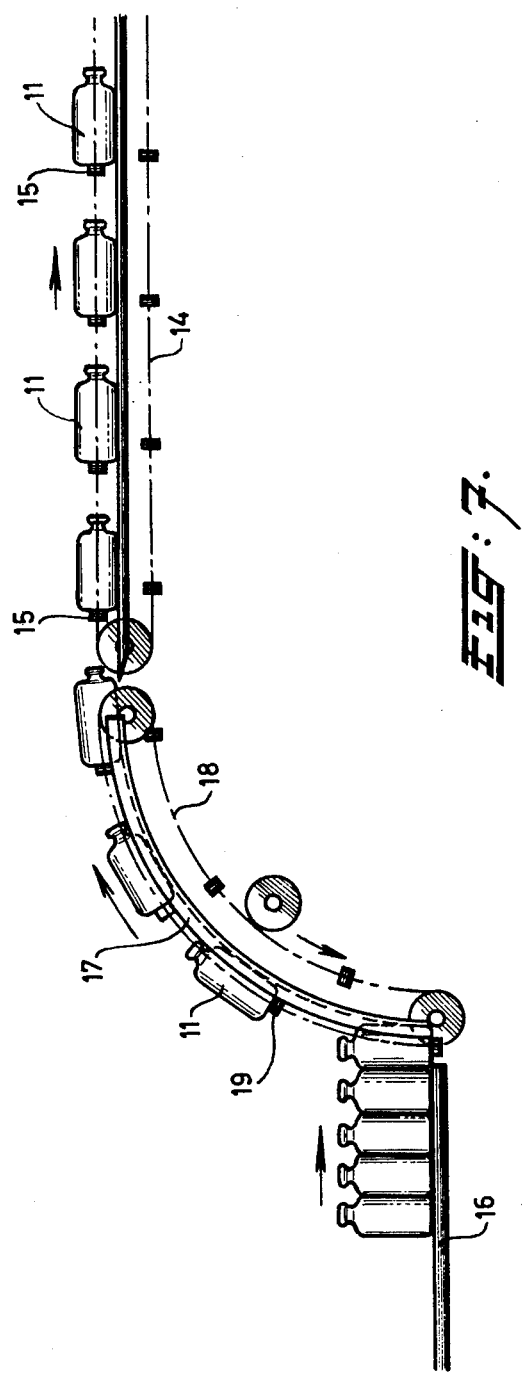

INSTALLATION FOR THE THERMAL TREATMENT OF OBJECTS

RELATED APPLICATIONS

This application is a continuation-in-part of the copending application Ser. No. 410,399 filed Oct. 29, 1973 by the same named inventor, now abandoned.

BACKGROUND OF THE INVENTION

This invention relates to an installation of the front loader type for the thermal treatment of objects, such as pasteurizing or sterilizing foodstuff or medicine, packed in glass or plastics, comprising a treatment space and an endless conveyor describing a path within this space. The conveyor has elongated carriers for the objects to be treated and each carrier comprises a gutter or channel-shaped member with a C-shaped cross section and with a lengthwise extending movable visor or cover. The installation further comprises a loading station and a discharge station to supply and discharge respectively the objects.

Such an installation is known in itself and is subject of the U.S. patent application Ser. No. 292,422 filed on Sept. 26, 1972, now U.S. Pat. No. 3,814,234. A phenomenon which occurs in practice, the so-called "drifting" of the objects in the carrier, can be a disadvantage in those circumstances in which an inspection of the objects (glass or plastic bottles) is necessary. This is, e.g. the case when pharmaceutical products to be used in hospitals are to be treated. This "drifting" is also a disadvantage when the containers are made from a plastic which becomes somewhat sticky when warm. Adjacent objects can then stick together when they touch each other, which is, of course, undesirable.

SUMMARY OF THE INVENTION

It is an object of the invention to provide such an improved installation in which drifting of an object longitudinally in a carrier is avoided and each object has a permanent position within the carrier and in which the loading and discharge station are adapted to this type of carrier.

To that end the installation according to the invention is distinguished in that each carrier is internally provided with a plurality of equidistant cross partition walls so that a number of compartments is formed, while the loading station is provided with a supply conveyor with driving dogs having the same mutual distance as the cross partition walls and the discharge station is provided with as many catching elements as there are compartments in each carrier.

The carrier is thus divided into a number of compartments so that each product or object has a permanent place. Such a carrier has all the advantages of a tube, since when travelling along the path of the conveyor through the treating space no danger exists of the object getting outside the carriers, particularly on rounding curves. The installation is, however, of the "front loader" type. As a result, in the loading as well as in the discharge station the visor or cover can be moved to open or expose the lengthwise extending opening.

With respect to the loading and discharging of objects as well as obtaining a stable positioning of the objects within the carrier, it is preferable that the objects are lying down in the carrier. But since this position is often disadvantageous for the further handling of the objects, the discharge station is provided with movable catching elements. Preferably, such a catching element has an L-shaped supporting piece on which the bottom as well as one side of an object can bear. The supporting piece is tiltable downwardly through 90° to place the objects in upright positions.

The installation according to the invention can be very easily adapted to treat at the same time products which are packed in different types of containers. In the pharmaceutical industry, the products may be packed in cylindrical bottles or jars of glass or plastic. Plastic bags or pouches can also be used as containers. In this last mentioned case there is no need for movable catching elements. To adapt the installation to the treating of objects which are not always of the same type, the catching elements are located at some distance parallel to the carriers moving along the discharge station. A sliding plate which is inclined downwardly at a small angle is therebetween and has a broad opening provided with a trap that can be moved between, and placed into, at least three positions:

a first position in which the opening is closed;

a second position in which the objects abut against an edge of this trap after being discharged;

a third position in which the opening is completely free.

In response to the treating of cylindrical objects (such as bottles) the trap will move periodically between the first and the second positions and for objects which have no permanent shape, such as plastic bags the trap is brought into the third positions. As there is in practice need of an installation which can treat an uninterrupted flow of objects of different types the installation according to the invention can accomplish this object. Since by a correct control the trap can be brought periodically into that position which is at that particular moment necessary.

For a more complete understanding of the present invention reference is made to the following detailed description and accompanying drawings.

SURVEY OF THE DRAWINGS

FIG. 7 is a schematic view of the loading station.

DESCRIPTION OF A PREFERRED EMBODIMENT

Figure 1:
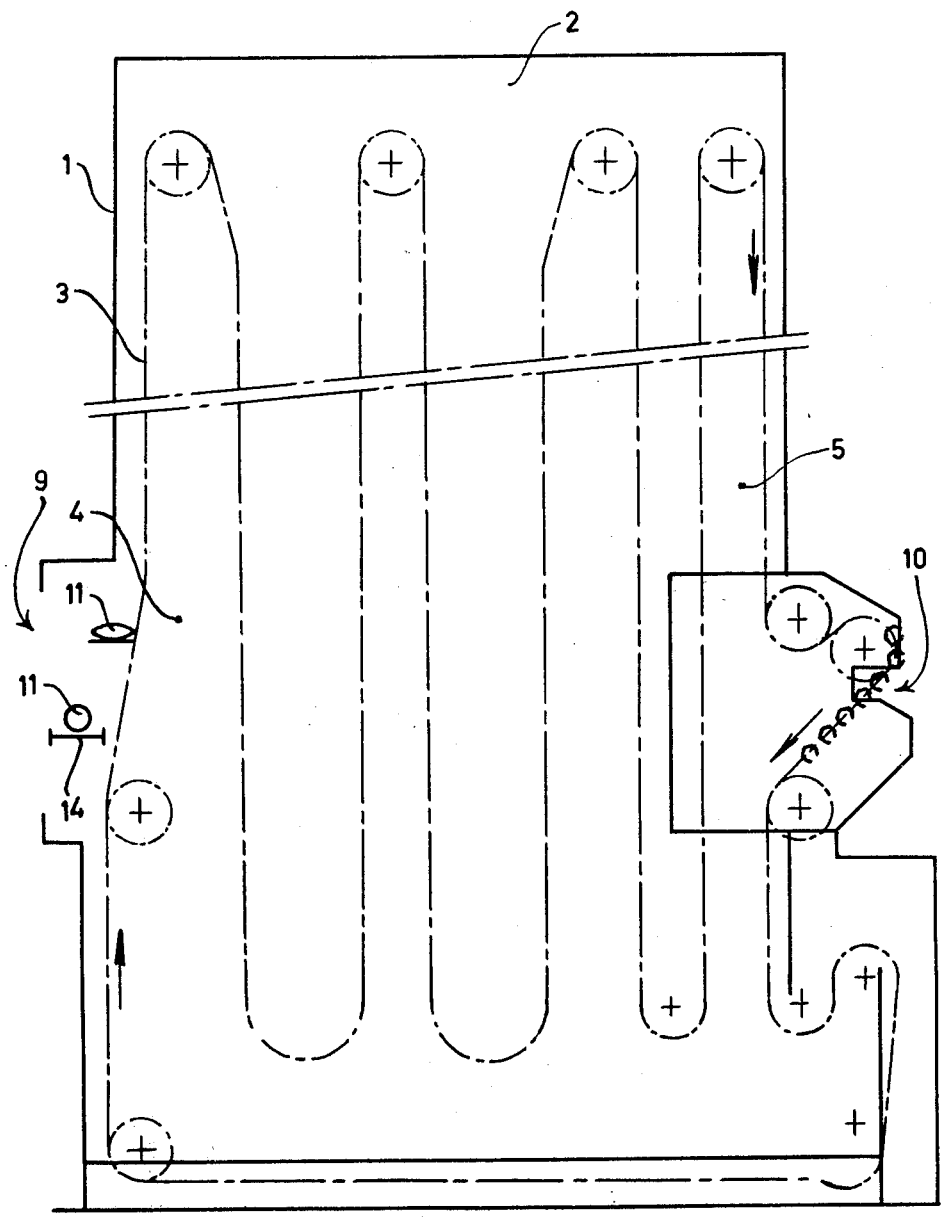
FIG. 1 is a schematic vertical cross section through the complete installation.

FIG. 1 shows the installation comprising a housing 1 enclosing a treating space 2. A conveyor 3 has its path of travel within this space, and also through a loading column 4 and a discharge column 5. The conveyor 3 is provided with carriers 6 of the type as described in the abovementioned U.S. Pat. No. 3,814,234 and each carrier may have a length of about 6 feet. Each carrier comprises a gutter 7 with a C-shaped cross section and a lengthwise extending, movable visor or cover 8. The installation is further provided with a loading station 9 and a discharge station 10 to supply and discharge respectively, the objects 11.

Figure 5:
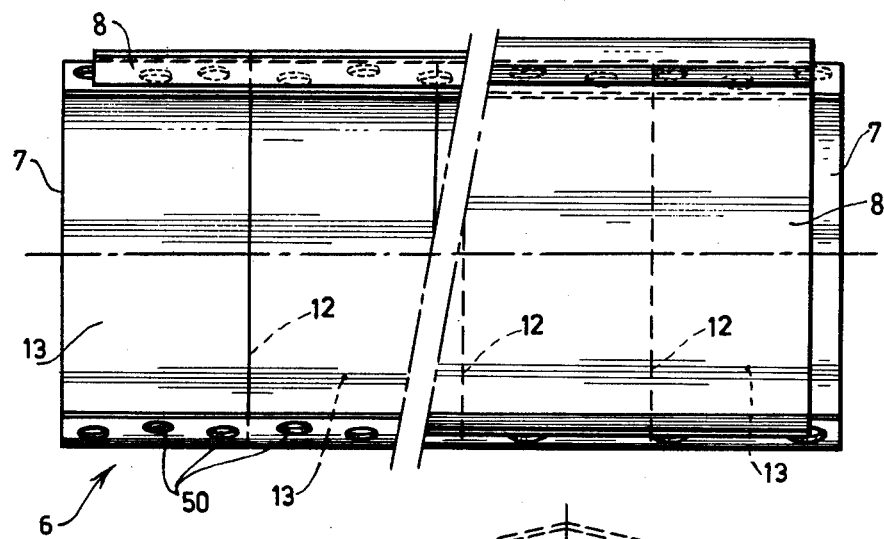
FIGS. 5 and 6 show respectively a side view and a cross section of one of the carriers.

As is best seen in FIG. 5 each carrier 6 is internally provided with a number of mutually equidistant cross partition walls 12. In this way a number of compartments 13 are formed having such a dimension with respect to the objects which are to be treated that in each compartment one object, e.g. a bottle or a jar of glass or plastic, respectively a plastic bag can be accommodated. The plastic can be a mixture of polypropylene and polyethene.

The loading station 9 is adapted to the dimensions of the compartments 13. The loading station comprises a supply conveyor 14 and the novel feature of the loading station is driving dogs 15 having the same mutual distance as the partition walls 12) see FIG. 7). The remaining structure of the loading station is conventional. The objects 11 are supplied over a table 16 and pressed against the foot of a curved gutter 17 along which a conveyor 18 moves with carriers 19, which have the similar mutual distance as the carriers 15 of the supply conveyor 14. By means of the device which is shown in FIG. 7 periodically an object 11 (or two or more adjacent objects 11) are carried along the gutter 17 to the supply conveyor 14 in the loading station 9. The supply conveyor 14 is parallel to the carriers so that objects can be loaded transversely from the conveyor to the carriers. The loading may be carried out by pushing or by gravity, such as in U.S. Pat. No. 3,842,963. The conveyors 14 and 18 act synchronously and intermittently so that periodically a number of objects 11 (e.g. 20 pieces) can be supplied in transverse direction to a carrier 6 which is at that moment present in the loading station 9. Loading systems for front end loading of a treating apparatus by transferring the objects transversely from the supply conveyor to a carrier are mentioned and known in the art. Such loaders, for example, are shown in U.S. Pat. Nos. 3,347,351 and 3,543,908.

Figure 2:
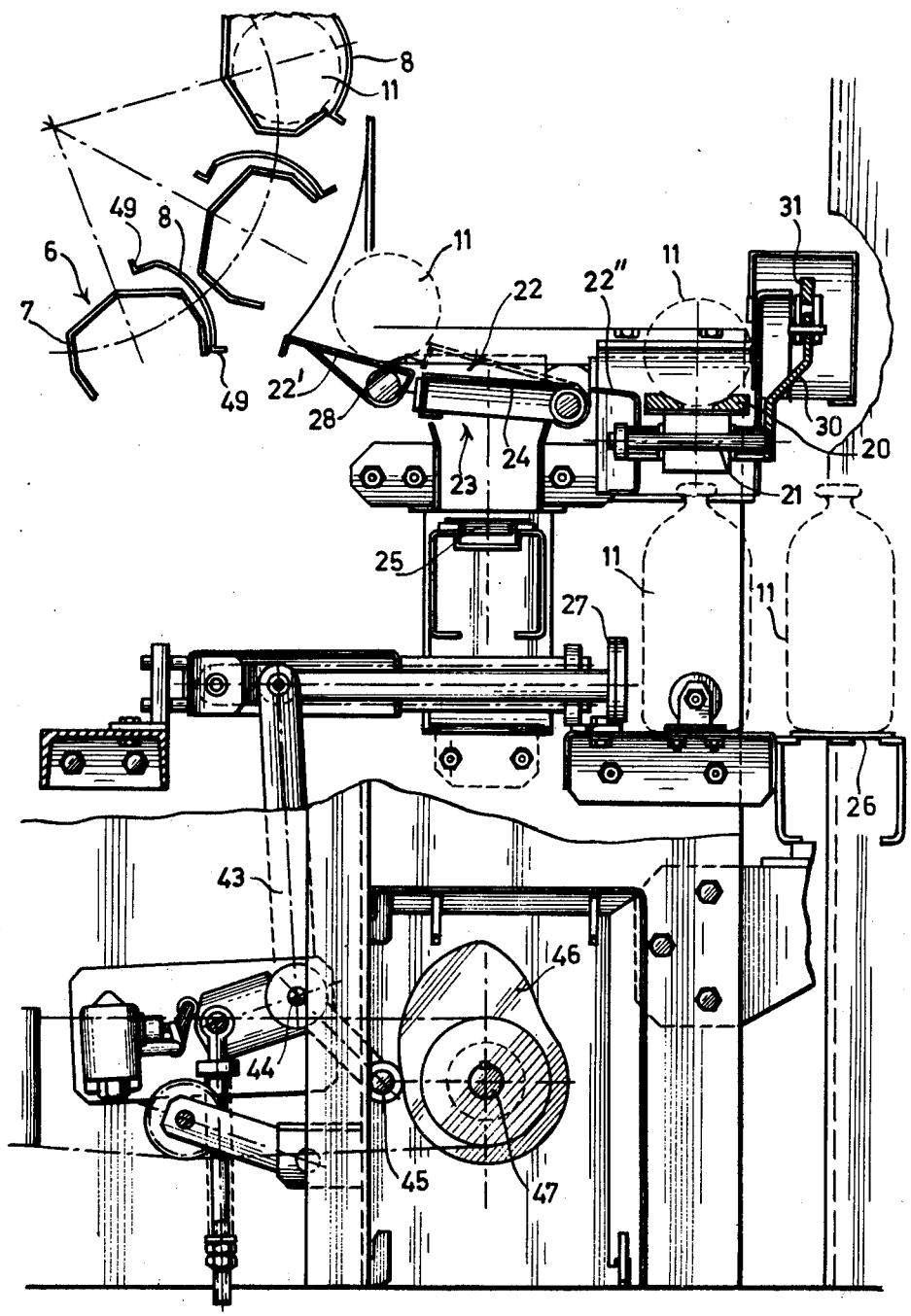
FIG. 2 is a cross section on enlarged scale of part of the discharge station.

The discharge station 10, which is best shown in FIG. 2, comprises a number of catching elements 20, as many as there are compartments 13 in each carrier 6. Each catching element 20 is formed as an L-shaped supporting piece, on which the bottom and one side of an object 11 can bear (see FIG. 3). This supporting piece can tilt over an angle of 90° downwardly along an axis 21. In this way an object on the support can be placed upright. The catching elements 20 lie at some distance from and parallel to the carriers 6. Between these carriers and the elements 20 there is a sliding plate 22, inclined downwardly somewhat, and having three parts. The first part 22' is adjacent the passing carriers 6, the last part 22'' is adjacent the catching elements 20. Therebetween is a broad opening 23 provided with a trap 24, forming the middle part of the sliding plate 22. The part 22' is periodically tilted downwardly to discharge possible splinters thereon. Beneath the opening 23 is the discharge conveyor 25. Next to the catching elements 20 is an endless belt 26 to discharge objects 11 coming from these elements. Furthermore, a pusher 27 is provided near by each catching element 20. This pusher is movable to shift the object 11 from the element 20 on to the belt 26.

The trap 24 can be moved between three positions:
a first position, shown in FIG. 2, in which the opening is closed;
a second position, shown with broken lines in which the objects 11 after being fed from a carrier 6 abut against the rim 28 of the trap;
a third position, not shown in the drawings, in which the trap 24 is vertical, and the opening 23 is completely free. In this position the objects coming from the carriers 6 fall directly onto the discharging conveyor 25 through opening 23.

Figure 3:
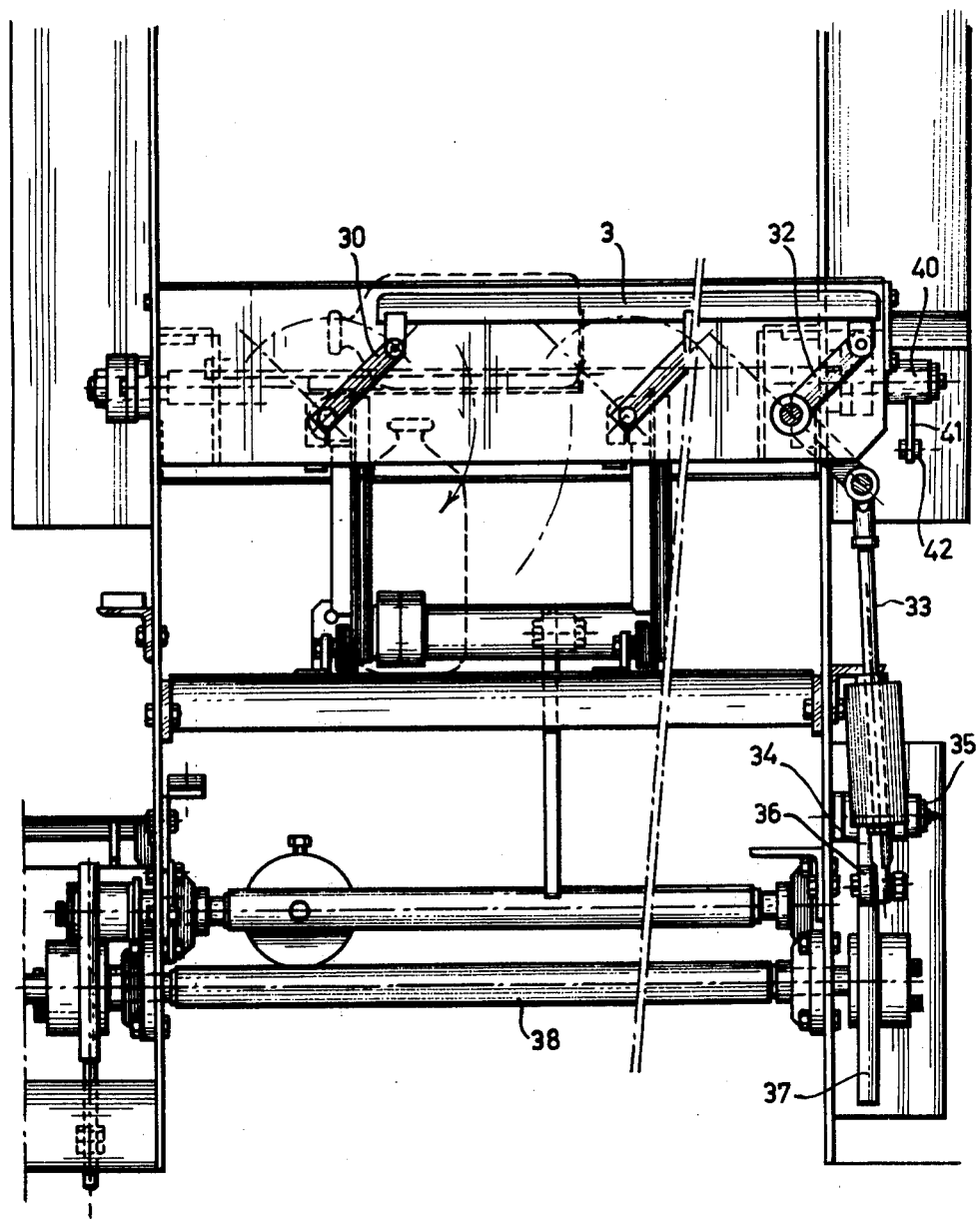
FIG. 3 is an end elevational view and shows the movable catching element.

Of course, the control of the various components is coordinated. To this end the shafts 21 of the catching elements 20 are coupled with each other through shackles 30, which are on the one hand fixedly connected to the relative shafts 21, and which are on the other hand hinged to a control rod 31. As is shown in FIG. 3 the end of the rod 31 is connected to a ball crank lever 32, which is on its turn connected to the lever 34 through a rod 33, with adjustable length. The lever 34 is at 35 hinged to the frame of the installation and is halfway its length provided with a roll 36 cooperating with a cam 37. This cam is fixed to a shaft 38 which is, in a way not shown, connected to the drive means of the installation.

Figure 4:
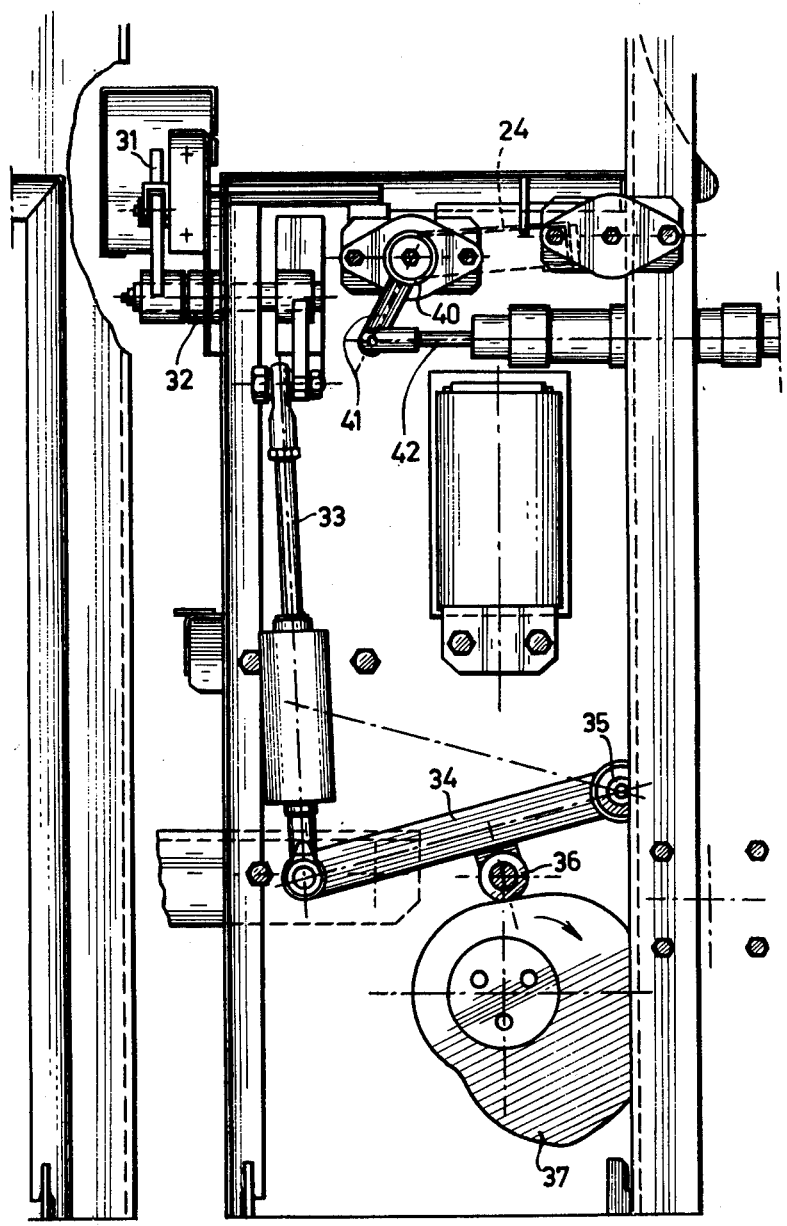
FIG. 4 is a view in a direction perpendicular to the plane of FIG. 3.

The control of the trap 24 is best seen in FIG. 4. The trap is supported by a shaft 40, supported in the frame of the installation. At its end the shaft 40 is provided with a lever 41 to which is connected a rod 42 which is movable between three positions corresponding with the abovementioned three positions of the trap 24. The control of each pusher 27 is also derived from the main drive of the installation. To this end each pusher is connected to one end of a bell crank lever 43 which can rotate around a shaft 44. The other end of the bell crank lever is provided with a roll 45, cooperating with a cam 46 of which the shaft 47 is coupled to the main drive of the installation, as is also the shaft 38.

Figure 6:
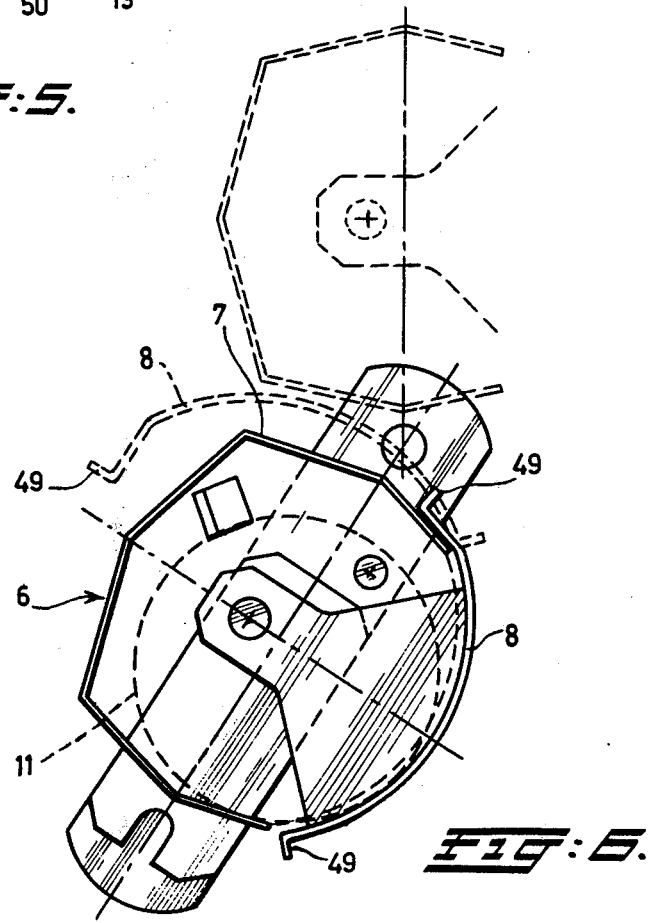

With regard to the carriers 6 which are shown in the FIGS. 1, 5 and 6, it is observed that the lengthwise extending rims of the visor 8 are provided with an outwardly bent edge 49. The purpose thereof is to prevent water in the treatment space 2 from flowing away along the outer circumference of the carriers and to force the water to enter into the carrier through the openings 50. The water is thus forced to come into contact with the objects 11 and a better heating or cooling, as the case may be, of these objects is obtained.

The installation operates as follows: when approaching the discharge station 10 the visor or cover 8 of the relative carrier 6 is opened while an abutment plate (not shown) prevents the objects moving out of the carriers. As soon as the objects reach the level of the sliding plate 22, the objects 11 emerge from the carrier and slide or roll against the edge 28 of the trap 24 which is in its middle position. In response to whether the objects 11 are bottles or jars on the one hand, or objects with no stable form such as sacks, pouches or bags, on the other hand the trap 24 is moved downwardly or upwardly. In the first case, the objects 11 roll to the catching elements 20, are the tilted, and shifted by the pushers 27 to the belt 26. In the second case, the trap has been moved upwardly and the objects fall through the openings 23 on the discharge conveyor 25.

The presence of the trap 24 has the result that the installation according to the invention can be used for treating two kinds of objects at the same time. It often happens that bottles as well as bags must be sterilized or pasteurized. By filling the carriers 6 alternatively and during a certain period with bottles or with bags, and by programming the movement of the trap 24 correspondingly a separate discharge of these products is possible.

It is observed that FIG. 7 shows an embodiment of the loading station to be used with bottles. Of course the supply of the bags can be done in similar or in a different, classic, way. However, this supply and loading is well known in the art and may be carried out using conventional apparatus.

The installation according to the invention distinguishes itself particularly by the possibility of treating objects of different kind, in which each object is enclosed in its own compartment so that the difficulties which have been sometimes encountered in the past when treating plastic objects are avoided.

It will be understood that this invention is susceptible to modification in order to adapt it to different usages and conditions, and accordingly, it is desired to comprehend such modifications within this invention as may fall within the scope of appended claims.

What is claimed is:

1. An installation of the front loader type for the thermal treatment of objects, such as pasteurizing or sterilizing foodstuff or medicine, packed in glass or plastic, the combination of means defining a treatment space and an endless conveyor describing a path within said space, said conveyor having a plurality of carriers for the objects to be treated, each carrier comprising a C-shaped cross section and with a lengthwise extending movable cover, each carrier being internally provided with equidistant cross partition walls to define a number of compartments, a loading station at which the objects are loaded on said carrier a discharge station to discharge the objects being treated, said discharge station comprising at least one oscillating L-shaped catching element on which the bottom and one side of an object being treated bear, said catching element being parallel to the carriers while receiving said articles, said discharge station further comprising means for defining a transitory path for the discharged treated objects thereby bridging a gap between the compartments in the carrier to said catching element, said catching element having a pivot axis which extends in substantial alignment with said transitory path.

2. An installation according to claim 1 wherein there is a plurality of said catching elements corresponding to the plurality of compartments in a carrier.

3. An installation according to claim 2 in which an endless belt is provided next to the catching elements to discharge the objects, a pusher which can move perpendicular to the belt being provided near to each catching element to slide the object from this catching element.

4. An installation according to claim 2 and a tiltable sliding plate disposed in the middle of said transitory path between said carriers and the catching elements, there being an opening beneath said sliding plate for discharging objects of a different size or shape.

5. An installation according to claim 4 in which the catching elements are spaced from and parallel to the carriers moving along the discharge stations, said tiltable sliding plate being positionable in at least three positions:

a first position in which the opening is closed;
a second position in which the objects abut, after being discharged, against an edge of said plate;
a third position in which the opening is completely free.

* * * * *